United States Patent [19]
Galbarini et al.

[11] 3,862,586
[45] Jan. 28, 1975

[54] GANTRY TYPE LARGE MACHINE TOOL
[75] Inventors: Maso Galbarini, Pavia; Francesco Cotta Ramusino, Milan, both of Italy
[73] Assignee: Innocenti Santeustacchio S.p.A., Brescia, Italy
[22] Filed: Sept. 24, 1973
[21] Appl. No.: 399,936

[30] Foreign Application Priority Data
Dec. 12, 1972 Italy................................ 32762/72

[52] U.S. Cl................................. 90/11 F, 408/235
[51] Int. Cl............................................... B23b 1/00
[58] Field of Search............ 408/235, 234; 90/15 R, 90/11 F, DIG. 28, 11 R

[56] References Cited
UNITED STATES PATENTS
2,983,199    5/1961    Daugherty...................... 408/235 X
3,707,333    12/1972    Kitamura et al.................... 408/235

*Primary Examiner*—Gil Weidenfeld

[57]    ABSTRACT

A gantry type machine tool structure in which there are one or more uprights supporting one or more cross beams along which one or more movable carriages carrying headstocks with the operating tools can move, in which the or each upright is formed in two structurally independent parts, a first part carrying guide and locating means for determining the vertical height of the cross beam or beams and which is unstressed by the weight thereof, and a second part which supports the weight of the cross beam or beams and their associated components but serves no guiding or locating function.

12 Claims, 6 Drawing Figures

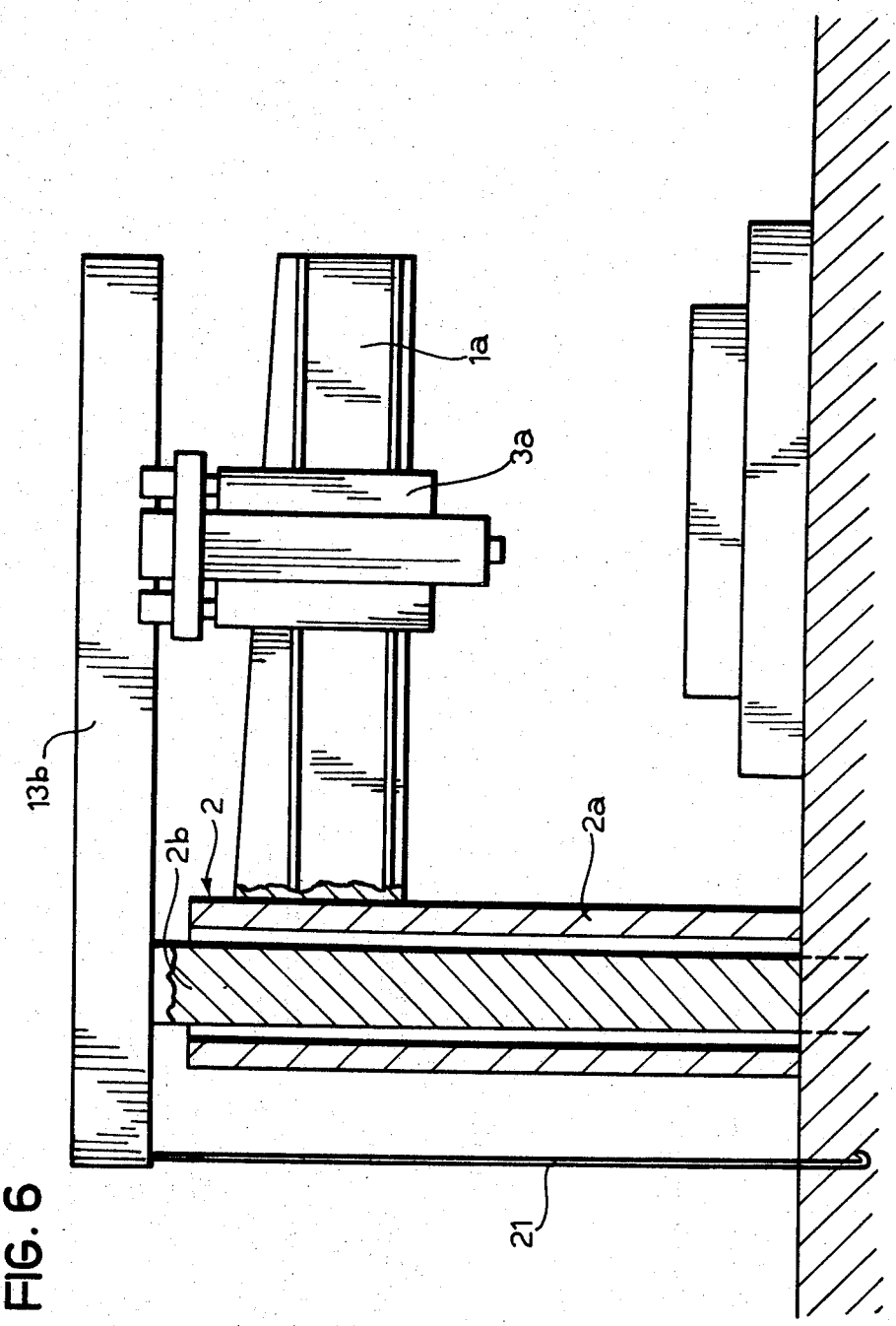

3,862,586

GANTRY TYPE LARGE MACHINE TOOL

BACKGROUND OF THE INVENTION

The present invention relates to machine tools, and particularly to large machine tools of the gantry type.

It is known that machine tools, and particularly machine tools of large dimensions, must be so constructed that the structures which support the guides of the movable parts of the machine tool must maintain dimensional stability and be able to withstand the variable stresses of compression, flexion, torsion and so on to which they are subject during use due to the weight of the movable parts of the machine tool. In practice, however, this has not been successfully achieved and the guides of previously known machines have thus been subject to some deformations during use with consequent undesired inaccuracies in the working of the tool despite the equipment used in an attempt to ensure the maintenance of dimensional stability.

A typical case illustrating the manner in which the geometry of the guides of a machine tool can vary during use is given by a surface milling machine of the gantry type having uprights which perform the double duty of supporting a cross beam having horizontal guides, and also of supporting an auxiliary cross beam or beams on which the weight of the carriage for the headstock is borne, the carriage being guided by the guides of the main cross beam. The force applied to each upright by the cross beams is not constant but depends on the lateral position of the headstock on the cross beam and also on the vertical position of the cross beams, so that each upright is stressed in a variable manner, and this gives rise to variability in the geometry of the guides thereby prejudicing the accuracy of operation of the machine tool.

The means generally used to reduce the deformations caused in this way by the weight of the machine comprise reinforcing the support structures of the machine in such a way that these deformations may be reduced to acceptable values, or alternatively in creating forces, and thus deformations, in a sense opposite to those due to the weight of the structure, by means of compensation systems.

However, equipment operating in this way is expensive and does not always give satisfactory results since it is possible only to achieve an attenuation of the deformations.

OBJECTS OF THE INVENTION

The main object of the present invention is to provide a support structure for machine tools, which is capable of substantially completely eliminating the deformations of the guides of a large machine tool due to the weight and variability of the position of the load thereon.

Another object of this invention is to provide a structure for machine tools which is simple to produce and of reasonable cost.

SUMMARY OF THE INVENTION

According to the present invention, a machine tool of the gantry type has at least one upright comprising two substantially parallel and structurally independent parts, one of which is provided with guide elements for guiding and locating the movable parts of the machine tool and the other of which carries means for supporting the weight of the movable elements of the machine tool and for transferring these weights to the said other part of the upright.

Various other features and advantages of this invention will become apparent during the course of the following description with reference to the accompanying drawings, which is provided purely by way of non-restrictive example.

BRIEF DESCRIPTION OF THE DRAWINGS

FIG. 6 diagrammatically illustrates a surface milling machine of the type having a single upright formed as a second embodiment of this invention.

DESCRIPTION OF THE PREFERRED EMBODIMENTS

Figure 1:
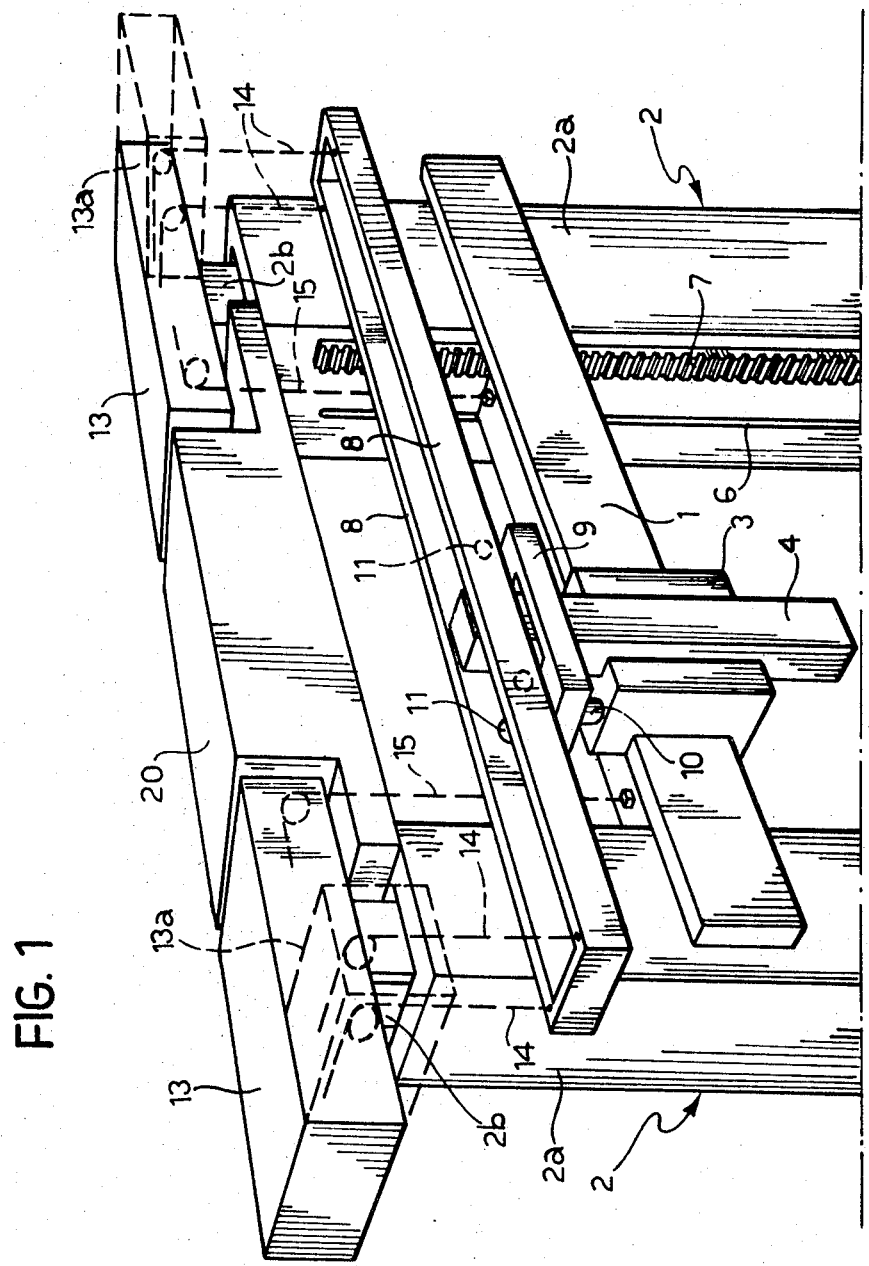
FIG. 1 is a diagrammatic perspective view of the principal parts of a surface milling machine of large dimensions formed as one embodiment of this invention.
Figure 2:
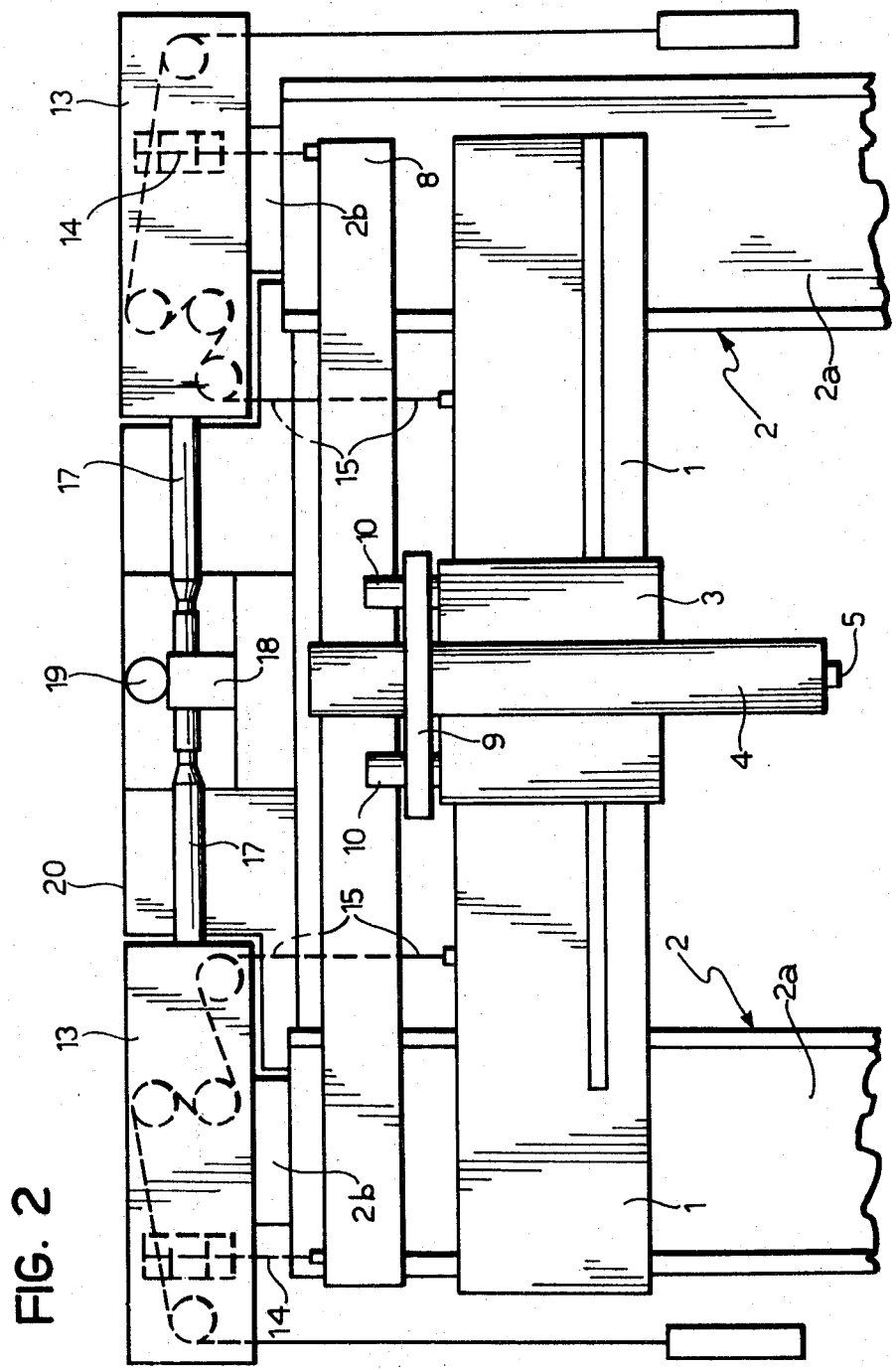
FIG. 2 is a front view of the main parts of the embodiment of FIG. 1.

With reference to FIGS. 1 to 5, there is shown a large surface milling machine of the gantry type having a horizontal cross beam 1 which is vertically movable along two fixed uprights 2. On the cross beam 1 there is mounted a carriage 3 which is movable along the cross beam and with which is associated a headstock 4 from the base of which projects a spindle 5 upon which the working tools are carried. The headstock 4 can be moved in the vertical direction with respect to the carriage 3 along suitable guides (not shown).

The cross beam 1 is movable in the vertical direction along vertical guides 6 and racks 7 fitted to the surfaces of the uprights 2 facing one another.

The carriage 3 is suspended from two horizontal auxiliary beams 8 which are parallel to the cross beam 1, by means of a suspension frame 9. The carriage 3 is suspended from the bracket 9 by an arrangement of cup springs 10 and the frame 9 is itself suspended from the auxiliary beams 8 along which it can move from one end to the other by means of rollers 11 which are movable upon tracks fixed to the beams 8.

Figure 5:
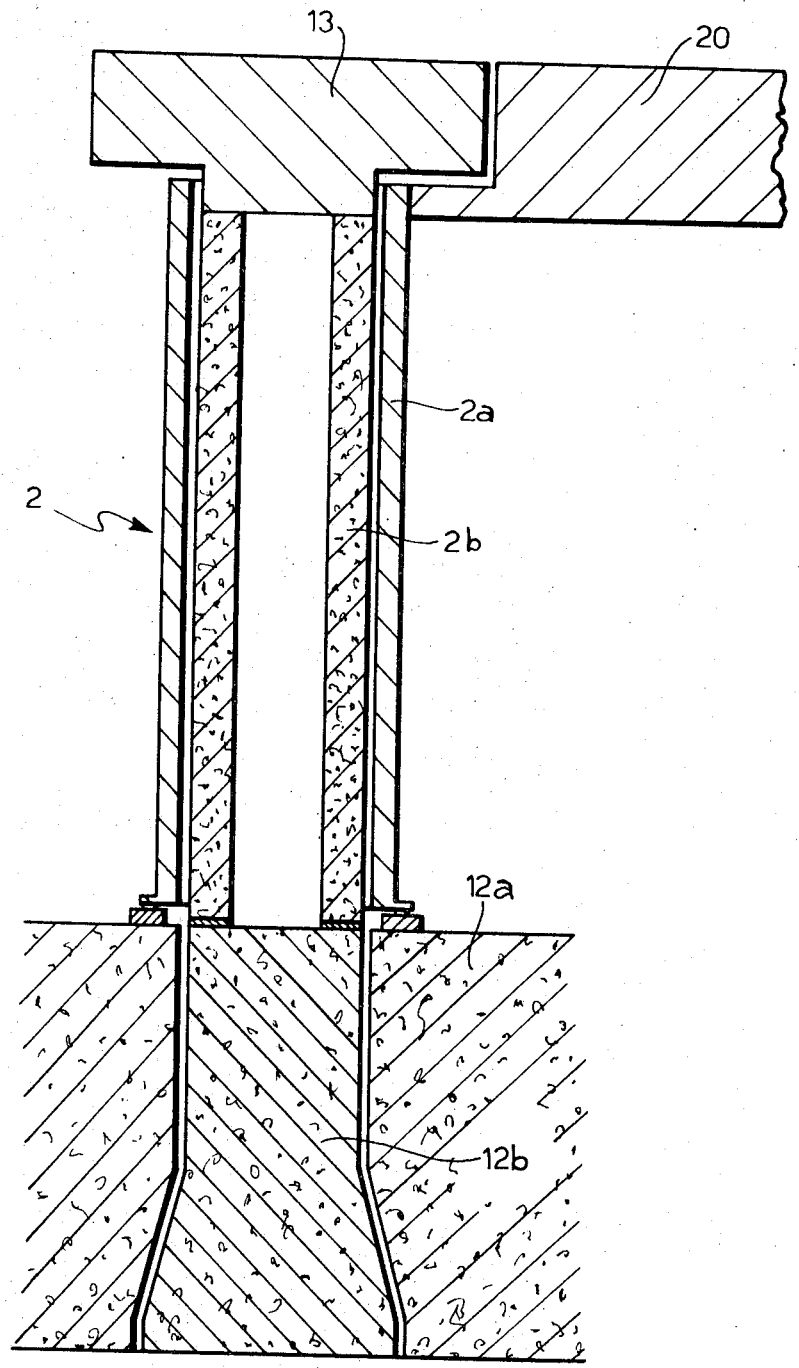
FIG. 5 is a diagrammatic section showing in greater detail an upright support of the embodiment of FIG. 1.

Each upright 2 is formed of two structurally independent parts. In the embodiment shown each upright comprises a tubular column 2a of box-section steel and a pillar 2b of reinforced concrete, of rectangular section, housed within the cavity of the box-section steel column 2a. The reinforced concrete pillar 2b may be solid or hollow as shown in FIG. 5. The column 2a and the pillar 2b of each upright 2 may be supported on a single foundation or, as shown in FIG. 5, may be supported on separate foundations 12a, 12b so as further to increase the structural independence of the two parts of the upright.

The auxiliary beams 8 are supported solely by the reinforced concrete pillars 2b and there is a space between the column 2a and the pillar 2b. At the top of each pillar 2b of each upright there is fitted a frame 13 which carries ropes or chains 14 which support respective ends of the auxiliary beams 8. The frames 13 also carry ropes or chains 15 which support the cross beam 1. The ropes or chains 14 and 15 are arranged to move in synchronism so as to raise or lower the auxiliary beams 8 and the cross beam 1 simultaneously.

Each frame 13 also carries a reduction gear 16 having two output shafts 16a and 16b (FIG. 3) one of which (16a) controls the ropes or chains 14 and the other of which (16b) controls the ropes or chains 15.

The two reduction gears 16 are driven by two shafts 17 which in turn are driven by a single motor 19 via a transmission device 18 which, together with the motor 19 constitutes a winch.

The transmission device 18, the motor 19 and part of each shaft 17 are housed in a framework 20 which is supported on the top of the tubular columns 2a of the uprights 2 and connected to the frames 13 on the reinforced concrete pillars 2b only by the driving connection formed by the shafts 17 projecting from the framework 20. The shafts 17 are coupled at each end by means of universal joints so that the shafts 17 cannot transfer any vertical load to or from the framework 20 from or to either of the frames 13.

Figure 3:
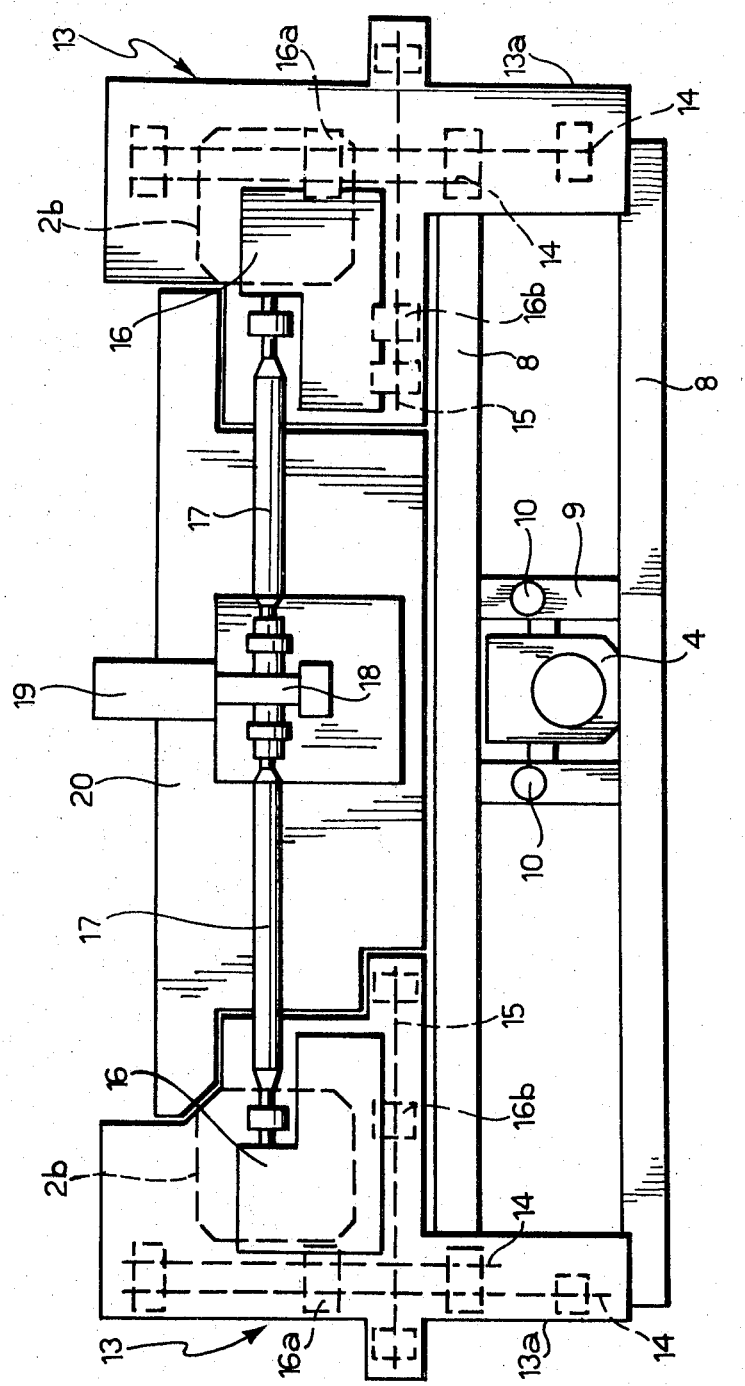
FIG. 3 is a plan view of the embodiment shown in FIGS. 1 and 2.
Figure 4:
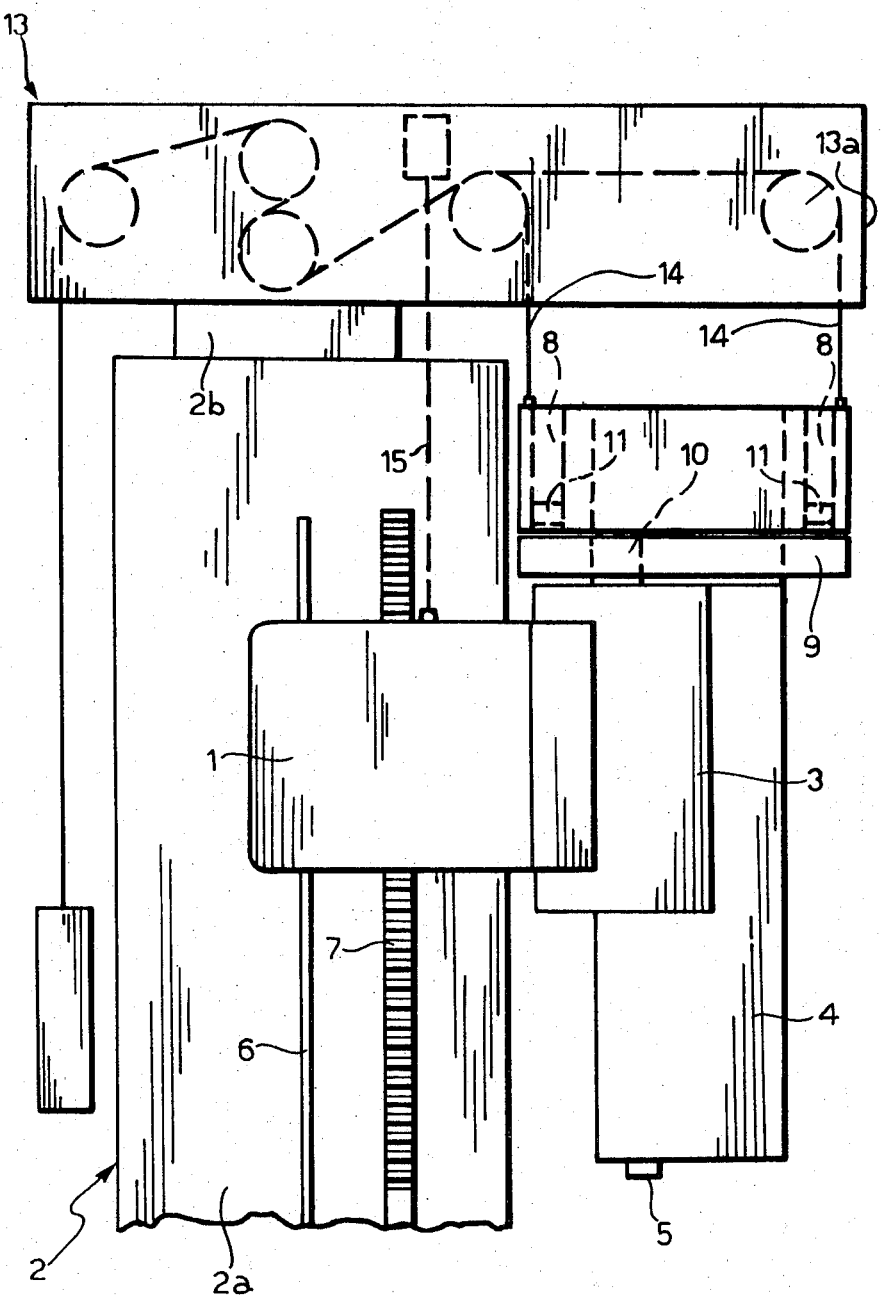
FIG. 4 is a schematic transverse sectional view of the embodiment shown in FIGS. 1 to 3.

The ropes or chains 14 supporting the auxiliary beams 8 pass over respective pulleys carried on projecting portions 13a of the frames 13 (see FIGS. 1, 3 and 4).

The auxiliary beams 8 and the cross beam 1 over which the carriage 3 is movable, are adjustable together in height, by the ropes or chains 14 and 15 which carry the weight of these components, whilst the vertical position of the cross beam 1 is determined with reference to the guides 6 and rack 7 which carry no load and ensure precision of movement.

As stated above the weight of the carriage 3 and of the headstock 4 is not carried by the cross beam 1, but is shared by the auxiliary beams 8 through the suspension frame 9, the springs 10, and the rollers 11. Thus the cross beam 1 is not subject to deformations due to changes in the lateral position of the carriage 3.

The whole weight of the movable parts of the apparatus, that is the auxiliary beams 8, the cross beam 1, the carriage 3, and the associated elements, is supported by the frames 13 which in their turn transfer the load to the reinforced concrete pillars 2b. The outer columns 2a of the uprights 2, being structurally independent from the pillars 2b, are therefore completely free from the weight of the movable parts of the apparatus and thus are not subject to any deformation upon adjustment of the position of the movable parts during operation of the machine. The guides 6 and rack 7 will thus retain their original dimensions in any operational situation, ensuring precision in the movement of the cross beam 1.

The weight of the framework 20, the centre of gravity of which remains in a fixed position, is carried by the outer columns 2a of the uprights 2. The functions of the supporting parts of the structure and the guiding parts of the structure are thus entirely separated. The small but inevitable deformations of the supports due to changes in position of the movable parts of the apparatus, that is the horizontal movement of the carriage 3 and the vertical movement of the whole movable assembly, will affect only the reinforced concrete pillars 2b and this will have no influence on the guiding parts of the structure since these are independent of the support pillars 2b.

It should be noted that by manufacturing the pillars 2b in reinforced concrete, that is, in material which is not expensive, it is possible to attain a reduction in costs with respect to the conventional structures of such machine tools.

When the structure is completed, a safety arrangement (not shown) of a type known in itself is fitted; this acts to lock the auxiliary beams 8 and the cross beam 1 in the event of breakage of the ropes or chains 14 or 15.

This arrangement with only minor modifications, can also be used for machine tools of the type in which the cross beam 1, rather than being movable, is fixed: in this case, the relative weights of the cross beam 1, the carriage 3 and associated headstock parts, are supported by the reinforced concrete pillars.

In an alternative embodiment there are provided a number of tension rods arranged in the rear part of the upright to which the top framework 13 is secured so that the only forces applied to the central reinforced concrete pillar 2b are those of compression, thereby taking better advantage of the characteristics of this material.

An embodiment of this type is particularly illustrated in FIG. 6 which shows a machine tool structure of the type having a single upright 2 which is constituted of a tubular outer column 2a of steel and a central pillar 2b of reinforced concrete on which a frame 13b is supported. The frame 13b is anchored to the ground by tension rods 21 arranged in the rear part of the machine tool.

In the embodiment illustrated in FIG. 6 also, all the weights of the different movable parts of the machine tool, that is the carriage 3a and the cross beam 1a, are borne by the reinforced concrete pillar 2b. The cross beam 1a is fixed in position with respect to the column 2a of the upright 2.

Various modifications may be made within the scope of the invention claimed. For example, the double-element uprights of this invention may also be used on machine tools with vertically movable cross beams, which are not provided with auxiliary beams for the transfer of the weight of the cross beam.

Again, for example, the double element upright structure of this invention may be used on machine tools which have several operating heads movable on a single cross beam.

Similarly, the dimensions and the materials can be any suitable without thereby departing from the scope of this invention, as described above and claimed below.

What is claimed is:

1. In a gantry type machine tool structure of the type having:
   at least one upright,
   at least one substantially horizontal beam being supported by and vertically movable on said upright,
   a carriage movable along said substantially horizontal beam,
   a headstock being carried by said movable carriage, the improvement wherein:
   said at least one upright is formed in first and second substantially parallel structurally independent vertical, supports said first support of said upright having vertical guide means and means for positioning the vertical height of said substantially horizontal beam, and means associated with said second support for transferring substantially all the weight of said substantially horizontal beam and the carriage and head stock carried thereon to said second support of said upright whereby said first support is not subject to deformation due to lateral positioning of said carriage.

2. The gantry type macine tool structure of claim 1 wherein said first and second supports of said upright are a hollow tubular column and an inner pillar located within the interior of said hollow column but spaced from the walls thereof.

3. The gantry type machine tool structure of claim 2 wherein said first support of said upright also supports parts of said machine tool which are not vertically displaceable thereon.

4. The gantry type machine tool structure of claim 1 wherein there are provided two such uprights having respective inner pillars and outer columns structurally independent therefrom, and said substantially horizontal beam extends between said two uprights as a cross beam, said inner pillars supporting respective frames on which the weight of said cross beam and the weight of said movable carriage and said headstock is borne.

5. The gantry type machine tool structure of claim 4 wherein said frames carry transmission devices by means of which the vertical height of said cross beam is adjustable.

6. The gantry type machine tool structure of claim 4 wherein the weight of said carriage movable along said cross beam is supported by a pair of auxiliary beams which are carried by said frames.

7. The gantry type machine tool structure of claim 6 wherein said cross beam and said pair of auxiliary beams are vertically movable simultaneously, by means of said transmission devices carried by said frames.

8. The gantry type machine tool structure of claim 4 wherein said outer columns of said two uprights carry a further framework on which is supported a motor driving said transmission devices on said frames of said inner pillars of said uprights.

9. The gantry type machine tool structure of claim 1 wherein said second support of said upright is connected to rods secured under tension to a fixed location.

10. The gantry type machine tool structure of claim 4 wherein each said inner pillar of each said upright is connected to rods secured under tension to a fixed location.

11. The gantry type machine tool structure of claim 1 wherein there is provided a first foundation for said first support of said upright and a second foundation for said second support of said upright, said first and second foundations being structurally independent of one another.

12. The gantry type machine tool structure of claim 2 wherein said hollow outer column first support of said upright is made of steel and said inner pillar second support of said upright is made of reinforced concrete.

* * * * *